US006333367B1

(12) United States Patent
Kato et al.

(10) Patent No.: US 6,333,367 B1
(45) Date of Patent: Dec. 25, 2001

(54) CATIONIC ELECTRODEPOSITION COATING COMPOSITION

(75) Inventors: Akiko Kato; Shigeo Nishiguchi; Reijiro Nishida; Shinji Miyatake; Hidehiko Haneishi, all of Kanagawa-ken (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 09/549,717

(22) Filed: Apr. 14, 2000

(30) Foreign Application Priority Data

Apr. 16, 1999 (JP) .................................. 11-109684
Mar. 31, 2000 (JP) .................................. 12-096387

(51) Int. Cl.⁷ .............................. C08K 3/20; C08L 63/02
(52) U.S. Cl. ...................... 523/409; 523/411; 523/412; 523/414; 523/415; 523/423; 525/65
(58) Field of Search ...................... 523/406, 409, 523/411, 412, 414, 415, 423; 525/65

(56) References Cited

U.S. PATENT DOCUMENTS 6,031,028 * 2/2000 Iino ...................................... 523/412

* cited by examiner

Primary Examiner—Robert Dawson
Assistant Examiner—D. Aylward
(74) Attorney, Agent, or Firm—Fisher, Christen & Sabol

(57) ABSTRACT

A cationic electrodeposition coating composition containing (A) an acrylic resin obtained by subjecting a mixture of 10 to 60% by weight of a hydroxyl group-containing acrylic monomer (a), 5 to 35% by weight of an amino group-containing acrylic monomer (b), 5 to 55% by weight of an aromatic vinyl monomer (c) and optionally another acrylic monomer (d) to a radical copolymerization reaction; (B) a hydroxyl group-containing acrylic resin-modified epoxy resin obtained by reacting 65 to 95% by weight of a resin composition consisting of 10 to 90% by weight of an epoxy resin (e) and 90 to 10% by weight of a hydroxyl group-containing acrylic resin (f) with 5 to 35% by weight of an amine compound (g); (C) a aliphatic and/or alicyclic blocked polyisocyanate compound, and (D) a bismuth compound component, a mixing ratio of the components (A), (B) and (C) being such that the component (A) is in the range of 40 to 90% by weight, the component (B) is in the range of 5 to 55% by weight and the component (C) is in the range of 5 to 40% by weight based on a total weight of solid contents in the components (A), (B) and (C), the component (D) being contained in such an amount as to be in the range of 0.01 to 10 parts by weight as a bismuth content per 100 parts by weight of a resin solid content in the electrodeposition coating composition.

12 Claims, No Drawings

CATIONIC ELECTRODEPOSITION COATING COMPOSITION

BACKGROUND OF THE INVENTION (1) Field of the Invention

The present invention relates to an electrodeposition coating composition, more particularly to a cationic electrodeposition coating composition which is free of lead and capable of forming a coating film showing good properties in both corrosion resistance and weather resistance.

(2) Description of Background Art

The electrodeposition coating method makes it possible to form a coating film showing good properties in durability, corrosion resistance, and the like, and has widely been used in an automobile, domestic article, other apparatus, etc. Taking the above advantages of the electrodeposition coating method, demand on an electrodeposition coating composition for use in one coating finish has recently been increased.

As the electrodeposition coating composition for use in one coating finish, an electrodeposition coating composition prepared by adding an acrylic resin to an epoxy resin, particularly a bisphenol type epoxy resin, is known in the art. However, the above electrodeposition coating composition has such drawbacks that a decreased epoxy resin content makes it impossible to obtain a satisfactory corrosion resistance, and an increased epoxy resin content so as to increase corrosion resistance makes it impossible to obtain a satisfactory weather resistance, resulting in making it impossible to obtain a satisfactory properties in both corrosion resistance and weather resistance.

SUMMARY OF THE INVENTION

It is an object of the present invention to provide a cationic electrodeposition coating composition which has a good coating bath stability and is capable of forming a coating film showing good properties in corrosion resistance, weather resistance and finish appearance.

That is, the present invention provides a cationic electrodeposition coating composition containing (A) an acrylic resin obtained by subjecting a mixture of 10 to 60% by weight of a hydroxyl group-containing acrylic monomer (a), 5 to 35% by weight of an amino group-containing acrylic monomer (b), 5 to 55% by weight of an aromatic vinyl monomer (c) and optionally another acrylic monomer (d) to a radical copolymerization reaction; (B) a hydroxyl group-containing acrylic resin-modified epoxy resin obtained by reacting 65 to 95% by weight of a resin mixture consisting of 10 to 90% by weight of an epoxy resin (e) and 90 to 10% by weight of a hydroxyl group-containing acrylic resin (f) with 5 to 35% by weight of an amine compound (g); (C) a aliphatic and/or alicyclic blocked polyisocyanate compound, and (D) a bismuth compound component, a mixing ratio of the components (A), (B) and (C) being such that the component (A) is in the range of 40 to 90% by weight, the component (B) is in the range of 5 to 55% by weight and the component (C) is in the range of 5 to 40% by weight based on a total weight of solid contents in the components (A), (B) and (C), the component (D) being contained in such an amount as to be in the range of 0.01 to 10 parts by weight as a bismuth content per 100 parts by weight of a resin solid content in the electrodeposition coating composition.

DETAILED DESCRIPTION OF THE INVENTION

Comonomers of the acrylic resin (A) used in the present invention comprises a hydroxyl group-containing acrylic monomer (a), an amino group-containing acrylic monomer (b), an aromatic vinyl monomer (c), and optionally another acrylic monomer (d).

Examples of the hydroxyl group-containing acrylic monomer (a) may include 2-hydroxyethyl(meth)acrylate, 2-hydroxypropyl(meth)acrylate, 4-hydroxybutyl(meth) acrylate, addition products of 2-hydroxyethyl(meth)acrylate with caprolactone such as Placcel FA-2, Placcel FM-3 and the like, and the like. These may be used alone or in combination. An amount of the hydroxyl group-containing acrylic monomer (a) is in the range of 10 to 60% by weight, preferably 30 to 50% by weight based on a total amount of monomer components of the acrylic resin (A). When the amount of the acrylic monomer (a) is more than 60% by weight, an increased hydrophilic property of the acrylic resin (A) results poor corrosion resistance of the electrodeposition coating film. On the other hand, when less than 10% by weight, a reduced water dispersibility due to the acrylic resin (A) results poor stability of the coating composition, and poor coating film performances due to an insufficient crosslinking density after heat curing.

Examples of the amino group-containing acrylic monomer (b) may include N,N-dimethylaminoethyl (meth) acrylate, N,N-diethylaminoethyl(meth)acrylate, N,N-dimethylaminopropyl(meth)acrylate, N,N-di-t-butylaminoethyl(meth)acrylate, N,N-dimethylaminopropyl (meth)acrylamide, and the like. An amount of the amino group-containing acrylic monomer (b) is in the range of 5 to 35% by weight, preferably 10 to 25% by weight based on a total amount of the comonomers of the acrylic resin (A). The amount of the amino group-containing acrylic monomer (b) more than 35% by weight results an electrodeposition coating film showing poor properties in weather resistance, corrosion resistance and the like due to the acrylic resin (A). On the other hand, when less than 5% by weight, a seriously reduced water dispersibility due to the acrylic resin (A) results poor stability of the coating composition.

An amount of the aromatic vinyl monomer (c) is in the range of 5 to 55% by weight, preferably 10 to 45% by weight based on a total amount of the comonomers of the acrylic resin (A). The aromatic vinyl monomer (c) more than 55% by weight makes it impossible to obtain an electrodeposition coating film having a smooth coating surface, and reduces weather resistance. When less than 5% by weight, a shortage of oxygen permeability makes it impossible to obtain a satisfactory corrosion resistance.

Examples of another acrylic monomer (d) may include methyl(meth)acrylate, ethyl(meth)acrylate, n-propyl(meth) acrylate, isopropyl(meth)acrylate, n-butyl(meth)acrylate, isobutyl(meth)acrylate, t-butyl(meth)acrylate, cyclohexyl (meth)acrylate, 2-ethylhexyl(meth)acrylate, and the like. An amount of another acrylic monomer (d) is in the range of 0 to 80% by weight, preferably 0 to 50% by weight.

The acrylic resin (A) may be prepared by subjecting the comonomers (a), (b), (c) and (d) to a radical copolymerization reaction according to a known process. Examples of an organic solvent used in the radical copolymerization reaction may include aromatic hydrocarbons such as toluene, xylene and the like; ketones such as methyl isobutyl ketone, cyclohexanone and the like; alcohols such as n-butanol, ethyl cellosolve, butyl cellosolve, methoxypropanol, ethylene glycol monobutyl ether and the like, and the like. These solvents may be used alone or in combination.

The radical copolymerization reaction may be carried out by reacting a mixture of the above comonomers in an organic solvent at a temperature in the range of about 50° C.

to about 300° C., preferably about 60° C. to 250° C. for about one hour to about 24 hours, preferably about 2 hours to about 10 hours under an inert gas such as nitrogen gas.

The acrylic resin (A) has a hydroxy value in the range of 10 to 300 mg KOH/g, preferably 50 to 200 mg KOH/g. A hydroxy value more than 300 mg KOH/g increases hydrophilic properties of the resin (A) and results poor corrosion resistance of the electrodeposition coating film. On the other hand, a hydroxy value less than 10 mg KOH/g results poor coating film performances because of reduction in water dispersibility and reduction in crosslinking density due to the resin (A).

The acrylic resin (A) has an amine value in the range of 10 to 125 mg KOH/g, preferably 15 to 80 mg KOH/g. An amine value more than 125 mg KOH/g increases hydrophilic properties of the resin (A), resulting an electrodeposition coating film showing poor properties in weather resistance, corrosion resistance and the like. On the other hand, when less than 10 mg KOH/g, water dispersibility of an emulsion due to the resin (A) may seriously be reduced.

The acrylic resin (A) has a number average molecular weight in the range of 2,000 to 100,000, preferably 5,000 to 50,000. A number average molecular weight less than 2,000 impairs stability of the emulsion. On the other hand, a number average molecular weight more than 100,000 may undesirably impair smoothness of the surface of the coating film.

The acrylic resin (A) has a solubility parameter in the range of 8.50 to 10.50, preferably 8.80 to 10.20, and the acrylic resin-modified epoxy resin (B) has a solubility parameter in the range of 9.0 to 11.0, preferably 9.3 to 10.7, so that the acrylic resin (A) component may form an upper layer of the coating film and the acrylic resin-modified epoxy resin (B) may form a lower layer of the coating film keeping good compatibility of the resin (A) with the resin (B).

The solubility parameter in the present invention represents a measure of an intermolecular interaction between liquid molecules and may hereinafter be referred to as SP. In the case where SPs of comonomers are known as listed, for example, in J. of Paint Technology, vol. 42, 176(1970), a SP of an acrylic resin such as the resins (A) and (B) is determined according to the following equation (1):

$$SP = SP_1 \times fw_1 + SP_2 \times fw_2 + \ldots SP_n \times fw_n \quad (1)$$

where $SP_1$, $SP_2$, ... $SP_n$ represent SPs of respective comonomers, and $fw_1$, $fw_2$, ... $fw_n$ represent weight fractions of respective comonomers based on a total weight of the comonomers. In the case where SPs of comonomers are not listed in the above literature, reference may be made to a catalog issued by a manufacturer or the like.

In the present invention, the acrylic resin (A) has a solubility parameter less than that of the acrylic resin-modified epoxy resin (B) by 0.1 or more, preferably 0.2 to 2.0. A solubility parameter difference less than 0.1 makes it impossible to form a coating film showing good corrosion resistance and weather resistance.

Hydroxy Group-containing Acrylic Resin-modified Epoxy Resin (B):

The acrylic resin-modified epoxy resin (B) may be prepared by a process which comprises reacting an epoxy resin (e) with α,β-ethylenically unsaturated carboxylic acid, subjecting the resulting α,β-ethylenically unsaturated group-containing epoxy resin, a hydroxyl group-containing acrylic monomer, and optionally another monomer to a radical copolymerization reaction, and reacting the resulting copolymer with an amine compound (g); or a process which comprises copolymerizing α,β-ethylenically unsaturated carboxylic acid, a hydroxyl group-containing acrylic monomer and optionally another monomer, reacting the resulting carboxyl group-containing resin with an epoxy resin, and reacting with the amine compound (g).

When an amount of the epoxy resin(e) in the acrylic resin-modified epoxy resin (B) is less than 10% by weight, an increased hydrophilic properties of the resin (B) makes it impossible to obtain an electrodeposition coating film showing a satisfactory corrosion resistance. On the other hand, when more than 90% by weight, reduction in water dispersibility due to a poor compatibility with the resin (A) makes stability of the coating composition poor, resulting in making coating film performances poor due to an insufficient crosslinking density after heat curing.

On the other hand, when an amount of the acrylic resin (f) in the acrylic resin-modified epoxy resin (B) is less than 10% by weight, reduction in water dispersibility due to a poor compatibility with the resin (A) makes stability of the coating composition poor. When more than 90% by weight, an increased hydrophilic properties of the resin (B) makes it impossible to obtain an electrodeposition coating film showing a satisfactory corrosion resistance. An amount of the amine compound (g) is in the range of 5 to 35% by weight, preferably 10 to 20% by weight based on a total amount of the resin mixture of the epoxy resin (e) and the acrylic resin (f) and the amine compound (g). Above mixing ratios of the epoxy resin (e) to the acrylic resin (f) are based on a total amount of both resins (e) and (f).

When an amount of the amine compound (g) is less than 5% by weight, reduction in water dispersibility of an emulsion reduces stability of the coating composition. On the other hand, when more than 35% by weight, an electrodeposition coating film shows unsatisfactory properties in corrosion resistance and weather resistance.

The epoxy resin (e) may include epoxy compounds having two or more epoxy groups in one molecule, suitably ones having a number average molecular weight of at least 340, preferably 400–3000, more preferably 800–1700, and particularly ones obtained by reaction of a polyphenol compound with epichlorohydrin. Examples of the polyphenol compound used in the preparation of the epoxy resin (e) may include bis(4-hydroxyphenyl)-2,2-propane, 4,4dihydroxybenzophenone, bis(4-hydroxyphenyl)-1,1-isobutane, bis(4hydroxy-t-butylphenyl)-2,2-propane, bis(2-hydroxynaphthyl)methane, tetra(4-hydroxyphenyl)-1,1,2,2-ethane, 4,4-dihydroxy-diphenylsulfone, phenol novolac, cresol novolac, and the like. The epoxy resin (e) having a number average molecular weight less than 340 results a coating film showing an unsatisfactory corrosion resistance. On the other hand, when more than 3,000, smoothness on the surface of the coating film may be impaired. The acrylic resin (f) comprises α,β-ethylenically unsaturated carboxylic acid, hydroxyl group-containing acrylic monomer, and optionally another monomer. Examples of the α,β-ethylenically unsaturated carboxylic acid may include acrylic acid, methacrylic acid, crotonic acid, itaconic acid, maleic acid, fumaric acid and the like. The hydroxyl group-containing acrylic monomer may include ones exemplified as the hydroxyl group-containing acrylic monomer (a).

Examples of another monomer may include methyl(meth)acrylate, ethyl(meth)acrylate, n-propyl(meth)acrylate, isopropyl(meth)acrylate, n-butyl(meth)acrylate, isobutyl (meth)acrylate, t-butyl(meth)acrylate, cyclohexyl(meth) acrylate, 2-ethylhexyl(meth)acrylate, styrene and the like. These may be used alone or in combination.

The acrylic resin (f) has a hydroxy value in the range of 30 to 200 mg KOH/g, preferably 50 to 150 mg KOH/g. A hydroxy value more than 200 mg KOH/g reduces water resistance and corrosion resistance. On the other hand, a hydroxy value less than 30 mg KOH/g reduces curing properties, weather resistance and corrosion resistance.

In the case where the epoxy resin (e) is reacted with the acrylic resin (f), the acrylic resin (f) has an acid value in the range of 1 to 50 mg KOH/g, preferably 10 to 30 mg KOH/g. When the acid value is less than 1 mg KOH/g, a decreased amount of the acrylic resin (f) added to the epoxy resin (e) results poor compatibility with the resin (A), poor water dispersibility, poor finish properties, and the like. An acid value more than 50 mg KOH/g may cause to take place gelling on the preparation of the acrylic resin-modified epoxy resin (B). The acrylic resin (f) has a number average molecular weight in the range of 2,000 to 10,000, preferably 5,000 to 8,000. The number average molecular weight of the acrylic resin (f) may be controlled depending on variation of reaction conditions, and a chain transfer agent such as dodecyl mercaptan, 2-ethylhexyl thioglycolate, styrene dimer and the like may be used. When the acrylic resin (f) has a number average molecular weight less than 2,000, an insufficient modification of the epoxy resin (e) with the acrylic resin (f) undesirably results poor compatibility with the acrylic resin (A), poor water dispersibility, and poor finish properties. On the other hand, a number average molecular weight more than 10,000 undesirably causes gelling to take place on the preparation of the acrylic resin-modified epoxy resin (B).

Examples of the amine compound (g) may include diethylamine, dibutylamine, methylbutylamine, diethanolamine and the like, and may also include a ketiminized block product of an amine compound such as diethylene triamine and the like. These may be used alone or in combination.

The acrylic resin-modified epoxy resin (B) may be prepared by subjecting the above components (e) and (f) to a reaction of carboxyl group with epoxy group, and a radical copolymerization reaction.

Examples of an organic solvent used in the above reactions may include aromatic hydrocarbons such as toluene, xylene and the like; ketones such as methyl isobutyl ketone, cyclohexanone and the like; alcohols such as n-butanol, ethyl cellosolve, butyl cellosolve, methoxypropanol, diethylene glycol monobutyl ether and the like; and the like. These solvents may be used alone or in combination. The reaction of carboxyl group with epoxy group may be carried out under the conditions of a temperature in the range of 50 to 200° C. and 30 minutes to 12 hours.

The acrylic resin-modified epoxy resin (B) used in the present invention has a solubility parameter in the range of 9.0 to 11.0, particularly 9.3 to 10.7. The solubility parameter (SP) of the resin (B) may be determined from SPa of the acrylic resin (f) and SPb of the epoxy resin (e) according to the following equation (2).

$$SP = (SPa \times Wt_1\% + SPb \times Wt_2\%)/100 \qquad (2)$$

where $Wt_1\%$ is a weight fraction of the acrylic resin (f), and $Wt_2\%$ is a weight fraction of the epoxy resin (e).

SPs of the epoxy resin (e) may be referred to Coating Review (No. 1932) as Epikote 828 (SP=10.4), Epikote 1001 (SP=11.5) and Epikote 1004 (SP=11.8).

Aliphatic and/or Alicyclic Blocked Polyisocyanate Compound (C):

The blocked polyisocyanate compound (C) used as a curing agent in the present invention is a compound prepared by blocking an aliphatic and/or alicyclic polyisocyanate compound with a blocking agent. A polyisocyanate compound other than the aliphatic and/or alicyclic polyisocyanate compound such as an aromatic polyisocyanate compound may cause to form a coating film showing degradation in weather resistance and the like. Examples of the aliphatic and/or alicyclic polyisocyanate compound may include aliphatic and alicyclic polyisocyanate compounds such as isophorone diisocyanate, hexamethylene diisocyanate, tetramethylene diisocyanate, methylene diisocyanate and the like; dimers thereof, trimers thereof, terminal isocyanate-containing compounds prepared by reacting an excess amount of the above isocyanate compounds with a low molecular active hydrogen-containing compound such as ethylene glycol, propylene glycol, trimethylol propane, hexane triol, castor oil and the like; and the like.

The blocking agent is such as to be added to the isocyanate group of the polyisocyanate compound to block the polyisocyanate compound, and is desirably such that the resulting blocked polyisocyanate compound is stable at room temperature and dissociates the blocking agent when heated at a temperature in the range of about 100° C. to 200° C., resulting in regenerating the isocyanate group. Examples of the blocking agent capable of satisfying the above requirements may include lactam compounds such as ε-caprolactam, γ-caprolactam and the like; oxime compounds such as methyl ethyl ketoxime, cyclohexanone oxime and the like; aromatic alkyl alcohols such as phenyl carbitol, methyl phenyl carbitol and the like; ethyl alcohol compounds such as ethylene glycol monobutyl ether and the like; and the like. Of these, oxime compounds and lactam compounds dissociate at relatively low temperatures, and are particularly desirable from the standpoint of low temperature curing properties of the electrodeposition coating composition.

A mixing ratio of respective components in the electrodeposition coating composition of the present invention is such that the component (A) is in the range of 40 to 90% by weight, preferably 55 to 85% by weight, and the component (B) is in the range of 5 to 55% by weight, preferably 10 to 30% by weight based on a total amount of the solid contents of the components (A), (B) and (C). A component (A) more than 90% by weight makes it impossible to obtain a satisfactory corrosion resistance. On the other hand, when less than 40% by weight, a satisfactory weather resistance can not be obtained. A component (B) more than 50% by weight makes it impossible to obtain a satisfactory weather resistance. On the other hand, when less than 5% by weight, a satisfactory corrosion resistance can not be obtained.

The component (C) is to be used in such an amount that all of the hydroxyl group contained in the acrylic resin (A) and the acrylic resin-modified epoxy resin (B) may be reacted, but preferably is in the range of 5 to 40% by weight, preferably 5 to 25% by weight. A component (C) more than 40% by weight impair finish properties of the electrodeposition coating film. When less than 5% by weight, an insufficient curing may reduce film performances.

Bismuth Compound Component (D):

The bismuth compound used in the bismuth compound component (D) may not particularly be limited, but may include bismuth oxide, bismuth hydroxide, basic bismuth carbonate, bismuth nitrate, bismuth benzoate, bismuth citrate, bismuth silicate and the like. Of these, bismuth oxide is preferred.

The bismuth compound component (D) used in the present invention may preferably include an aqueous organic acid-bismuth salt solution prepared by reacting the above bismuth compounds with at least two organic acids, at least one of which is an aliphatic hydroxycarboxylic acid, in water.

Examples of the aliphatic hydroxycarboxylic acid used in the preparation of the aqueous organic acid-bismuth salt solution may include glycolic acid, glycerinic acid, lactic acid, dimethylol propionic acid, dimethylol butyric acid, dimethylol valeric acid, tartaric acid, malic acid, hydroxymalonic acid, dihydroxysuccinic acid, trihydroxysuccinic acid, methylmalonic acid and the like. Of these, monocarboxylic acids are useful, lactic acid being particularly preferable. These may be used alone or in combination.

An amount of the aliphatic hydroxycarboxylic acid in the organic acid component is in the range of 20 to 99 mol %, preferably 30 to 95 mol %, and more preferably 40 to 90 mol % per 100 mol % of a total amount of the organic acids. When less than 20 mol %, preparation of a water-soluble bismuth salt may be difficult. When more than 99 mol %, the resulting electrodeposition coating film may undesirably show poor properties in finish properties and the like. An organic acid other than the aliphatic hydroxycarboxylic acid may not particularly be limited unless water solubilization of the bismuth salt may be inhibited, but may preferably include aliphatic carboxylic acids having 6 or less carbon atoms, preferably 5 or less carbon atoms. Examples of the aliphatic carboxylic acid may include formic acid, acetic acid, propionic acid, butyric acid, succinic acid, adipic acid, glutaric acid and the like, particularly formic acid, acetic acid and propionic acid. These may be used alone or in combination.

The aqueous organic acid-bismuth salt solution may be prepared by reacting, for example, one mole of bismuth oxide with 3 to 8 moles, preferably 3.4 to 7 moles of the organic acid in water. An organic acid less than 3 moles makes difficult water solubilization. On the other hand, when more than 8 moles, presence of an excess amount of the organic acid in an electrodeposition coating bath undesirably reduces electrodeposition coating properties.

In the case where bismuth hydroxide is used, the aqueous organic acid-bismuth salt solution may similarly be prepared by reacting one mole of bismuth hydroxide with 1.5 moles, preferably 1.7 moles to 3.5 moles of the organic acid in water. A method of adding the bismuth compound may include a method of adding into an emulsion, a method of adding into a pigment paste, and combinations thereof.

An amount of the aqueous organic acid-bismuth salt solution is such that an amount of bismuth may be in the range of 0.01 to 10 parts by weight, preferably 0.05 to 5 parts by weight per 100 parts by weight of a resin solid content in an electrodeposition coating composition. A bismuth content less than 0.01 part by weight may result a coating film showing unsatisfactory corrosion resistance. When more than 10 parts by weight, weather resistance may be reduced.

In addition to the above components (A), (B), (C) and (D), the cationic electrodeposition coating composition of the present invention may optionally contain color pigments, anticorrosive pigments, extender pigments, dyes, additives and the like, and may include clear coating compositions free of pigments.

The color pigment may include inorganic pigments such as titanium oxide, carbon black, iron oxide, lead chromate and the like; and organic pigments such as Anilin Black, Vermillion Red, Lake Red, Phthalocyanine blue, Fast Sky Blue and the like. Anticorrosive pigments may include basic lead silicate and the like. Extender pigments may include kaolin, barium sulfate and the like.

Neutralization•water solubilization of a base resin such as acrylic resin, acrylic resin-modified epoxy resin or the like may be carried out by making the base resin water-oluble or water-dispersible with a water-soluble organic acid such as an aliphatic carboxylic acid, particularly acetic acid, formic acid and the like, or mixtures thereof. On neutralization•water solubilization, the aqueous organic acid-bismuth salt solution may partly or wholly neutralized to be used. Use of acetic acid and/or formic acid as a neutralizing agent may result good properties in finish properties, throwing power, low temperature curing properties and the like.

The electrodeposition coating composition of the present invention may also contain a tin compound. Examples of the tin compound may include organotin compounds such as dibutyltin oxide, dioctyltin oxide and the like; aliphatic or aromatic carboxylates of dialkyltin, for example, dibutyltin dilaurate, dioctyltin dilaurate, dibutyltin diacetate, dioctyltin benzoateoxy, dibutyltin benzoateoxy, dioctyltin dibenzoate, dibutyltin dibenzoate and the like, and the like.

Of these, dialkyltin aromatic carboxylate is preferable from the standpoint of low temperature curing properties. A tin content in the electrodeposition coating composition may not particularly be limited, and may widely be varied depending on performances required in the electrodeposition coating composition, but preferably may be in the range of 0 to 8 parts by weight, preferably 0.05 to 5 parts by weight per 100 parts by weight of a resin solid content in the electrodeposition coating composition.

A preparation method of the electrodeposition coating composition in the present invention may not particularly be limited, but may include known preparation methods in known coating compositions. One of the preparation methods may be explained hereinafter.

The electrodeposition coating method in the present invention may include the known cationic electrodeposition coating method which comprises, for example, adding deionized water or the like to the electrodeposition coating composition of the present invention for diluting so as to be a solid content in the range of about 5 to 40% by weight, followed by controlling pH in the range of 4.0 to 9.0 to prepare an electrodeposition coating bath, controlling the coating bath at a temperature in the range of 15 to 35° C., and carrying out an electrodeposition coating under a loading voltage of 50 to 400 V.

The present invention can provide an cationic electrodeposition coating composition containing a specified acrylic resin, a specified acrylic resin-modified epoxy resin, a specified blocked polyisocyanate compound and a bismuth compound component, capable of showing a good coating bath stability, and capable of forming a coating film showing good properties in corrosion resistance, weather resistance and finish appearance.

EXAMPLE

The present invention is explained more in detail by the following Examples, in which "part" and "%" represent "part by weight" and "% by weight" respectively.

Preparation of Acrylic Resin (A)

Preparation Example 1

A two liter—four necked flask was charged with 246 parts of propylene glycol monomethyl ether, followed by introducing nitrogen gas, keeping at 110° C., and dropping a mixture of the following formulation as also shown in Table 1 over 3 hours.

| | |
|---|---|
| styrene | 25 parts |
| methyl methacrylate | 18 parts |
| n-butyl acrylate | 6 parts |
| 2-hydroxyethyl methacrylate | 12 parts |
| Placcel FM-3 (trade name, marketed by Daicel Chemical Industries, Ltd.) | 24 parts |
| dimethylaminoethyl methacrylate | 15 parts |
| azobisisobutyronitrile | 3 parts |

One hour after the completion of dropping, a solution prepared by dissolving 8 parts of 2,2'-azobis (2-methylbutyronitrile) into 56 parts of propylene glycol monomethyl ether was dropped thereinto over one hour, followed by keeping at 110° C. for one hour after the completion of dropping, adding 44 parts of methyl isobutyl ketone to obtain an acrylic resin solution (A-1) having a solid content of 67% and a Gardner viscosity of Z3.

Preparation Examples 2–5

Preparation Example 1 was duplicated except that formulations as shown in Table 1 were used respectively to obtain acrylic resin solutions (A-2) to (A-5).

TABLE 1

| | Preparation Examples | | | | |
|---|---|---|---|---|---|
| | 1 | 2 | 3 | 4 | 5 |
| Formulations | | | | | |
| Styrene | 25 | 45 | 25 | 0 | 25 |
| methyl methacrylate | 18 | 0 | 33 | 40 | 30 |
| n-butyl acrylate | 6 | 4 | 27 | 9 | 9 |
| 2-hydroxyethyl methacrylate | 12 | 12 | 0 | 12 | 12 |
| Placcel FM3 | 24 | 24 | 0 | 24 | 24 |
| dimethylaminoethyl methacrylate | 15 | 15 | 15 | 15 | 0 |
| Azobisisobutyronitrile | 3 | 3 | 3 | 3 | 3 |
| acrylic resin (A) solution | A-1 | A-2 | A-3 | A-4 | A-5 |
| Property values | | | | | |
| solid content (%) | 67 | 67 | 67 | 67 | 67 |
| vicosity of resin solution | Z3 | Z4 | Z2 | Z2 | Z2 |
| resin hydroxy value (mg KOH/g) | 80 | 80 | 0 | 80 | 80 |
| resin amine value (mg KOH/g) | 53 | 53 | 53 | 53 | 0 |
| resin SP | 9.67 | 9.71 | 9.30 | 9.62 | 9.45 |
| resin number average molecular weight | 16.000 | 14.000 | 15.000 | 13.000 | 15.000 |

Preparation of Acrylic Resin-Modified Epoxy Resin (B)

Preparation Example 6

(Preparation of acrylic resin (f))

A two liter, four necked flash was charged with 200 parts of propylene glycol monomethyl ether and 50 parts of ethylene glycol butyl ether, followed by introducing nitrogen gas, keeping at 120° C., and dropping thereinto a mixture of the following formulation over 4.5 hours.

| | |
|---|---|
| styrene | 50 parts |
| 2-hydroxymethacrylate | 19 parts |
| Placcel FM-3 | 24 parts |
| acrylic acid | 2 parts |
| AMSD-GRH (trade name, marketed by Goy Chemical Co., Ltd.) chain transfer agent | 5 parts |
| 2,2'-azobis (2-methylbutyronitrile) | 5 parts |

One hour after the completion of dropping, a solution prepared by dissolving 5 parts of 2,2'-azobis (2-methylbutyronitrile) into 25 parts of propylene glycol monomethyl ether was dropped thereinto over one hour, followed by keeping at 120° C. for one hour after the completion of dropping to obtain an acrylic resin solution (f) having a solid content of 75% and SP of 9.47.

Preparation Example 7

A two liter, four necked flask was charged with 375 parts of Epikote 828 (trade name, marketed by Oil Shell Epoxy Co., Ltd., bisphenol A type epoxy resin having an epoxy equivalent of 190), 150 parts of bisphenol A and 2.05 parts of diethanolamine, followed by reacting at 120° C. for 2 hours to obtain an epoxy resin (e) having a number average molecular weight of 1600, adding thereinto 650 parts of the acrylic resin solution (f) obtained in Preparation Example 6, adding 37 parts of diethanolamine, reacting at 120° C., decreasing the reaction temperature to 100° C., adding 54 parts of a methyl isobutyl ketone solution (solid content 70%) of a ketiminized product of diethylenetriamine, and reacting for 2 hours to obtain an acrylic resinmodified epoxy resin solution (B-1) having a solid content of 70% and SP of 10.6.

Preparation of Blocked Polyisocyanate Compound (C)

Preparation Example 8

Fifty parts of isophorone diisocyanate was dropped into 40 parts of methylketoxime at 40 to 60° C., followed by heating at 80° C. for one hour to obtain a blocked polyisocyanate compound (C-1).

Preparation of Aqueous Organic Acid-Bismuth Salt Solution (D-1)

A flask was charged with 200 g of 90% lactic acid (2 moles as lactic acid), 60 g (one mole) of acetic acid and 623 g of deionized water followed by heating at 60° C., slowly adding thereinto 232 g (0.5 mole) of bismuth oxide, heating and reacting at 60° C. for 4 hours to confirm that an yellow solid content in the liquid reaction mixture has disappeared so as to be transparent, and adding 3347 g of deionized water to obtain an aqueous lactic acid and acetic acid-bismuth salt solution (D-1) having a solid content of 10%.

Preparation of Pigment Dispersed Paste (G-1)

Preparation Example 9

A formulation of 4.7 parts of the acrylic resin-modified epoxy resin solution (B-1) prepared in Preparation Example 7 and having a solid content of 70%, and 1.4 parts of 10% formic acid was mixed in a ball mill, followed by adding deionized water, mixing with agitation, adding thereinto 16.5 parts of titanium white, 8 parts of clay, 0.3 part of carbon black and 3 parts of dioctyltin oxide, and subjecting to dispersion for 40 hours to obtain a pigment dispersed paste (G-1) having a solid content of 55%.

Preparation of Clear Emulsions (E-1)–(E-7)

Respective components (A) to (D) according to the formulation shown in Table 2 were uniformly mixed and stirred followed by dropping 150 parts of deionized water with a strong agitation over about 15 minutes to obtain cationic electrodeposition clear emulsions (E-1) to (E-7) having a solid content of 33.5% respectively.

TABLE 2

| Clear emulsion | | E-1 | E-2 | E-3 | E-4 | E-5 | E-6 | E-7 |
|---|---|---|---|---|---|---|---|---|
| Component A | A-1 | 51.5 | | | | | 82.0 | 51.5 |
| | A-2 | | 72.9 | | | | | |
| | A-3 | | | 51.5 | | | | |
| | A-4 | | | | 51.5 | | | |
| | A-5 | | | | | 51.5 | | |
| Component B | B-1 | 30.5 | 9.1 | 30.5 | 30.5 | 30.5 | 30.5 | 30.5 |
| SP difference between components (A) and (B) | | 0.93 | 0.39 | 1.3 | 0.98 | 1.15 | 0.93 | 0.93 |
| Component C | C-1 | 2.0 | 2.0 | 2.0 | 2.0 | 2.0 | 2.0 | 0 |
| Component D | D-1 | 2.0 | 2.0 | 2.0 | 2.0 | 2.0 | 2.0 | 0 |
| 10% formic acid | | 13.0 | 13.0 | 13.0 | 13.0 | 13.0 | 13.0 | 15.0 |

Preparation of Cationic Electrodeposition Coating Compositions

Examples 1–2 and Comparative Examples 1–5

Clear emulsions and pigment dispersed pastes were mixed according to the formulations shown in Table 3 and uniformly stirred, followed by adding and diluting with deionized water to obtain cationic electrodeposition coating compositions having a solid content of 20% respectively.

TABLE 3

| | Examples | | Comparative Examples | | | | |
|---|---|---|---|---|---|---|---|
| | 1 | 2 | 1 | 2 | 3 | 4 | 5 |
| Clear emulsions | | | | | | | |
| kind | E-1 | E-2 | E-3 | E-4 | E-5 | E-6 | E-7 |
| amount (part) | 298 | 298 | 298 | 298 | 298 | 298 | 298 |
| Pigment dispersed pastes | | | | | | | |
| kind | G-1 | G-1 | G-1 | G-1 | G-1 | G-1 | G-1 |
| amount (part) | 60 | 60 | 60 | 60 | 60 | 60 | 60 |
| Bath stability | 3 | 3 | 1 | 3 | 1 | 3 | 2 |
| 60° Gloss | 79 | 80 | 65 | 75 | — | 57 | 63 |
| Weather resistance | 76 | 72 | 25 | 88 | — | 76 | 81 |
| Corrosion resistance | 4 | 3 | 1 | 1 | — | 1 | 1 |

Coating Test

Into the above cationic electrodeposition coating compositions was dipped a 0.8×150×70 mm cold rolled dull finish steel sheet chemically treated with a Palbond #3030 (trade name, marketed by Nihon Parkerizing Co., Ltd., zinc phosphate treating agent), followed by carrying out an electrodeposition coating by use of the steel sheet as a cathod under 300 V to form an electrodeposition coating dry film of about 20 μm, washing with water, and heat curing at 170° C. for 20 minutes to obtain coating test panels, which were subjected to the following test methods. Test results are shown in Table 3.

Test Method

Bath stability:
Development with time of separation in a coating bath was examined and results were evaluated as follows.
3: One month after, no separation was developed.
2: After 7 to 14 days, separation developed.
1: Next day, separation developed.
60° Gloss:
A 60° specular reflection was measured in accordance with JIS K-5400 7.6 (1990).
Weather Resistance: Gloss retension percentage (%) after 1000 hours' test by Sunshine Weather Meter.
Corrosion Resistance: Crosscuts were formed with a knife onto an electrodeposition coating film of respective electrodeposition coating test panels so that cuts may reach a base material. The resulting crosscut test panels were subjected to a salt spray test for 1000 hours in accordance with JIS Z-2371. Test results were evaluated depending on width of rust and blister from a knife cut as follows.
4: A maximum width of rust and blister from the cut is less than 1 mm (one side).
3: A maximum width of rust and blister from the cut is 1 mm or more but less than 2 mm (one side).
2: A maximum width of rust and blister from the cut is 2 mm or more but less than 3 mm (one side), and considerable amount of blisters develop on a plane area.
1: A maximum width of rust and blister from the cut is 3 mm or more, and blisters develop all over the coating film (one side).

What is claimed is:

1. A cationic electrodeposition coating composition containing (A) an acrylic resin obtained by subjecting a mixture of 10 to 60% by weight of a hydroxyl group-containing acrylic monomer (a), 5 to 35% by weight of an amino group-containing acrylic monomer (b), 5 to 55% by weight of an aromatic vinyl monomer (c) and optionally another acrylic monomer (d) to a radical copolymerization reaction; (B) a hydroxyl group-containing acrylic resin-modified epoxy resin obtained by reacting 65 to 95% by weight of a resin mixture consisting of 10 to 90% by weight of an epoxy resin (e) and 90 to 10% by weight of a hydroxyl group-containing acrylic resin (f) with 5 to 35% by weight of an amine compound (g); (C) a aliphatic and/or alicyclic blocked polyisocyanate compound, and (D) a bismuth compound component, a mixing ratio of the components (A), (B) and (C) being such that the component (A) is in the range of 40 to 90% by weight, the component (B) is in the range of 5 to 55% by weight and the component (C) is in the range of 5 to 40% by weight based on a total weight of solid contents in the components (A), (B) and (C), the component (D) being contained in such an amount as to be in the range of 0.01 to 10 parts by weight as a bismuth content per 100 parts by weight of a resin solid content in the electrodeposition coating composition.

2. A composition as claimed in claim 1, wherein the acrylic resin (A) has a hydroxy value in the range of 10 to 300 mg KOH/g.

3. A composition as claimed in claim 1, wherein the acrylic resin (A) has an amine value in the range of 10 to 125 mg KOH/g.

4. A composition as claimed in claim 1, wherein the acrylic resin (A) has a solubility parameter in the range of 8.5 to 10.5.

5. A composition as claimed in claim 1, wherein the acrylic resin (A) has a number average molecular weight in the range of 2,000 to 100,000.

6. A composition as claimed in claim 1, wherein the epoxy resin (e) in the acrylic resin-modified epoxy resin (B) is a bisphenol type epoxy resin and has a number average molecular weight of at least 340.

7. A composition as claimed in claim 1, wherein the acrylic resin (f) in the acrylic resin-modified epoxy resin (B) has an acid value in the range of 1 to 50 mg KOH/g.

8. A composition as claimed in claim 1, wherein the acrylic resin (f) in the acrylic resin-modified epoxy resin (B) has a hydroxy value in the range of 30 to 200 mg KOH/g.

9. A composition as claimed in claim 1, wherein the acrylic resin (f) in the acrylic resin-modified epoxy resin has a number average molecular weight in the range of 2,000 to 10,000.

10. A composition as claimed in claim 1, wherein the acrylic resin-modified epoxy resin (B) has a solubility parameter in the range of 9.0 to 11.0.

11. A composition as claimed in claim 1, wherein the acrylic resin (A) has a solubility parameter less than that of the acrylic resinmodified epoxy resin (B) by 0.1 to 2.0.

12. A composition as claimed in claim 1, wherein the bismuth compound component (D) is an aqueous organic acid-bismuth salt solution prepared by reacting a bismuth compound with at least two organic acids, at least one of which is an aliphatic hydroxycarboxylic acid, in water.

* * * * *

Disclaimer

6,333,367 B1 — Akiko Kato; Shigeo Nishiguchi; Reijiro Nishida; Shinji Miyatake; Hidehilo Haneishi, all of Kangawa-ken, Japan. CATIONIC ELECTRODEPOSITION COATING COMPOSITION. Patent dated January 18, 2000. Disclaimer filed on March 13, 2013, by the Assignee, Kansai Paint Co., Ltd.

Hereby enters this disclaimer to claims 1 to 12 of said patent.

*(Official Gazette, June 25, 2013)*